(12) United States Patent
Hartvigsen et al.

(10) Patent No.: US 6,224,993 B1
(45) Date of Patent: May 1, 2001

(54) ELECTROLYTE FOR SOLID OXIDE FUEL CELLS

(75) Inventors: Joseph Jay Hartvigsen, Kaysville; Singaravelu Elangovan, Sandy; Robert Phillip Merrill, Orem; Ashok Chandrashekhar Khandkar, Salt Lake City, all of UT (US)

(73) Assignee: Sofco, Salt Lake City, UT (US)

( * ) Notice: Subject to any disclaimer, the term of this patent is extended or adjusted under 35 U.S.C. 154(b) by 0 days.

(21) Appl. No.: 09/176,032

(22) Filed: Oct. 21, 1998

(51) Int. Cl.[7] ............................................. H01M 8/10
(52) U.S. Cl. ........................ 429/30; 429/34; 29/623.1
(58) Field of Search ........................... 429/30, 33, 34, 429/36, 16, 32; 29/623.4, 623.1

(56) References Cited

U.S. PATENT DOCUMENTS

| | | |
|---|---|---|
| 4,396,480 | 8/1983 | Hegedus et al. ..................... 429/30 |
| 4,857,420 | 8/1989 | Maricle et al. ..................... 429/30 |
| 4,910,100 * | 3/1990 | Nakanishi et al. ................. 429/32 |
| 4,950,562 * | 8/1990 | Yoshida et al. .................... 429/32 |
| 5,145,754 * | 9/1992 | Misawa et al. ..................... 429/32 |
| 5,162,167 | 11/1992 | Minh et al. ........................ 429/30 |
| 5,270,131 * | 12/1993 | Diethelm et al. ................... 429/34 |
| 5,312,700 | 5/1994 | Ishida .............................. 429/30 |
| 5,547,777 * | 8/1996 | Richards ........................... 429/32 |

FOREIGN PATENT DOCUMENTS 1-128359   5/1989   (JP) .

* cited by examiner

Primary Examiner—Stephen Kalafut
Assistant Examiner—Julian A. Mercado
(74) Attorney, Agent, or Firm—Factor & Partners

(57) ABSTRACT

An electrolyte, and a process for its formation, for a solid oxide fuel cell comprising an electrolyte plate and a supporting member. The electrolyte plate includes an upper and a lower surface. The support member includes a plurality of non-intersecting support members which are positioned on at least one of the upper and the lower surfaces of the electrolyte plate.

17 Claims, 5 Drawing Sheets

ELECTROLYTE FOR SOLID OXIDE FUEL CELLS

BACKGROUND OF THE INVENTION

1. Field of the Invention

The invention is directed in general to electrolytes of solid oxide fuel cells, and more particularly, to an improved electrolyte structure and associated method of manufacturing same.

2. Background Art

Solid oxide fuel cells (SOFCs) are well known in the art. Indeed, SOFCs are recognized as having the potential to mitigate environmental problems while meeting the power generation and cogeneration needs of tomorrow. Thus, much emphasis has been concentrated on the lowering of the SOFC operating temperatures while increasing SOFC stack performance.

In particular, one such development has been the use of the electrode supported thin film electrolytes for high performance SOFC systems. Processes for manufacturing thin electrolyte films include Allied Signal roll calandering, Lawrence Berkeley Labs and University of Missouri (Rolla) spin coated sol-jel, University of Utah dip coated, Dow tape laminate, and Westinghouse electrochemical vapor deposition (EVD) processes. Each of these processes are capable of producing 5–50 $\mu$m electrolyte layers on an electrode substrate. In particular, calendering and tape lamination processes appear to be the most promising and have demonstrated some levels of commercial viability in electronic chip packaging.

While these types of structures have been demonstrated to be quite successful in small area single cells, these structures have not been applicable with success to stackable large area cells. In particular, thin film electrolyte relies on the substrate electrode material for mechanical support. The mechanical, chemical and micro structural requirements of the electrode function are incompatible with the mechanical support functions of the electrode. In addition, due to the porous microstructure required by the electrode, the mechanical strength of the electrode is quite poor. With both the anode and the cathode materials, volume and composition changes accompany oxygen potential changes, and, these changes all greatly affect the mechanical integrity of the cell.

In addition, the exposure to the oxygen potential gradients are unavoidable in the prior art inasmuch as the supporting electrodes extend to cell edges so as to fully support the thin film electrolyte, exposing cathodes to fuel and anodes to air. In addition, the use of nickel cermet anode substrates which are fired in air as oxide, is likewise detrimental to the mechanical integrity of the cell. In particular, as the NiO is reduced to nickel as the cell begins operation, the cell is detrimentally affected relative to its mechanical strength.

One solution has been disclosed in Ishida, U.S. Pat. No. 5,312,700. This reference contemplates the use of intersecting support ribs on a single plane, on one or both sides of a thin plate for increased support and rigidity of the electrolyte. While this disclosure addresses certain of the shortcomings relative to strength, the intersecting support structure is difficult, time consuming and costly to manufacture.

SUMMARY OF THE INVENTION

The present invention is directed to an electrolyte for a solid oxide fuel cell. The electrolyte comprises an electrolyte plate and means for supporting the electrolyte plate. The electrolyte plate includes an upper surface and a lower surface. The support means includes a plurality of non-intersecting support members. The support members are positioned on at least one of the upper and lower surfaces of the electrolyte plate.

In a preferred embodiment, the non-intersecting support members may be positioned on both of the upper and lower surfaces of the electrolyte plate. Moreover, in such an embodiment, the non-intersecting support members on the upper surface of the electrolyte plate are substantially perpendicular to the non-intersecting support members on the lower surface of the electrolyte plate.

In another preferred embodiment, the non-intersecting support members are substantially identical in geometric configuration. In such an embodiment, the non-intersecting support members may be substantially rectangular or sinusoidal.

In a preferred embodiment, the non-intersecting support members are of a thickness greater than the electrolyte plate.

Preferably, the non-intersecting support members extend across the entirety of the electrolyte plate.

In yet another preferred embodiment, the electrolyte plate and the non-intersecting support members comprise a yttria stabilized zirconia.

The invention further includes a method of manufacturing the electrolyte of a solid oxide fuel cell. The method includes the steps of providing an electrolyte plate, having an upper surface and a lower surface, and a second plate; forming an opening through the second plate; and positioning the second plate on one of the upper and lower surfaces of the electrolyte plate, in a desired orientation. Once positioned, the method further includes the steps of associating the electrolyte plate with the second plate; and trimming the associated electrolyte plate and second plate, so as to render a plurality of non-intersecting support members on the electrolyte plate.

In a preferred embodiment, the method further comprises the steps of providing a third plate; forming at least one opening through the third plate; positioning the third plate on the opposite side of the electrolyte plate from which the second plate is positioned; and associating the third plate with the electrolyte plate. In such an embodiment, the step of trimming further renders a plurality of non-intersecting support members on both surfaces of the electrolyte plate. Moreover, in such a preferred embodiment, the third plate may be positioned such that the at least one opening of the second plate is perpendicular to the at least one opening of the third plate.

In another preferred embodiment, the step of forming openings in the second and/or third plates comprises the forming of a plurality of substantially identical openings in each plate which are substantially parallel to each other. Subsequently, the step of positioning further comprises the positioning of the second and third plates so that the openings in the second plate are substantially perpendicular to the openings of the third plate.

In another preferred embodiment, the method may further comprise the step of forming registering openings on each of the electrolyte plate and the second plate. In such an embodiment, the step of positioning further comprises the step of aligning the registering openings of each of the electrolyte plate and the second plate, to, in turn, properly orientate the plates relative to each other.

BEST MODE FOR PRACTICING THE INVENTION

Figure 1:
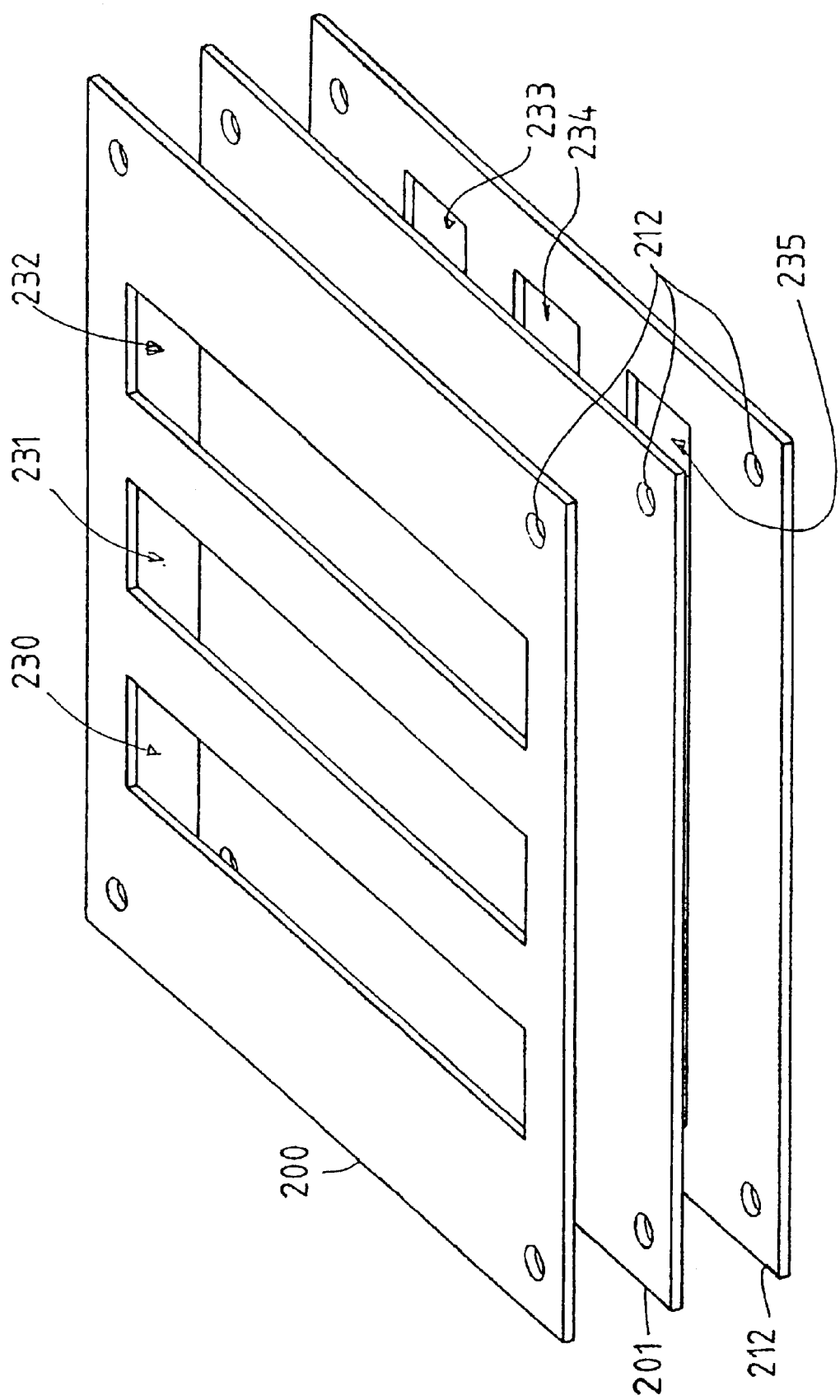
FIG. 1 of the drawings is a perspective view of the three laminate layers which comprise the electrolyte of the present invention.
Figure 2:
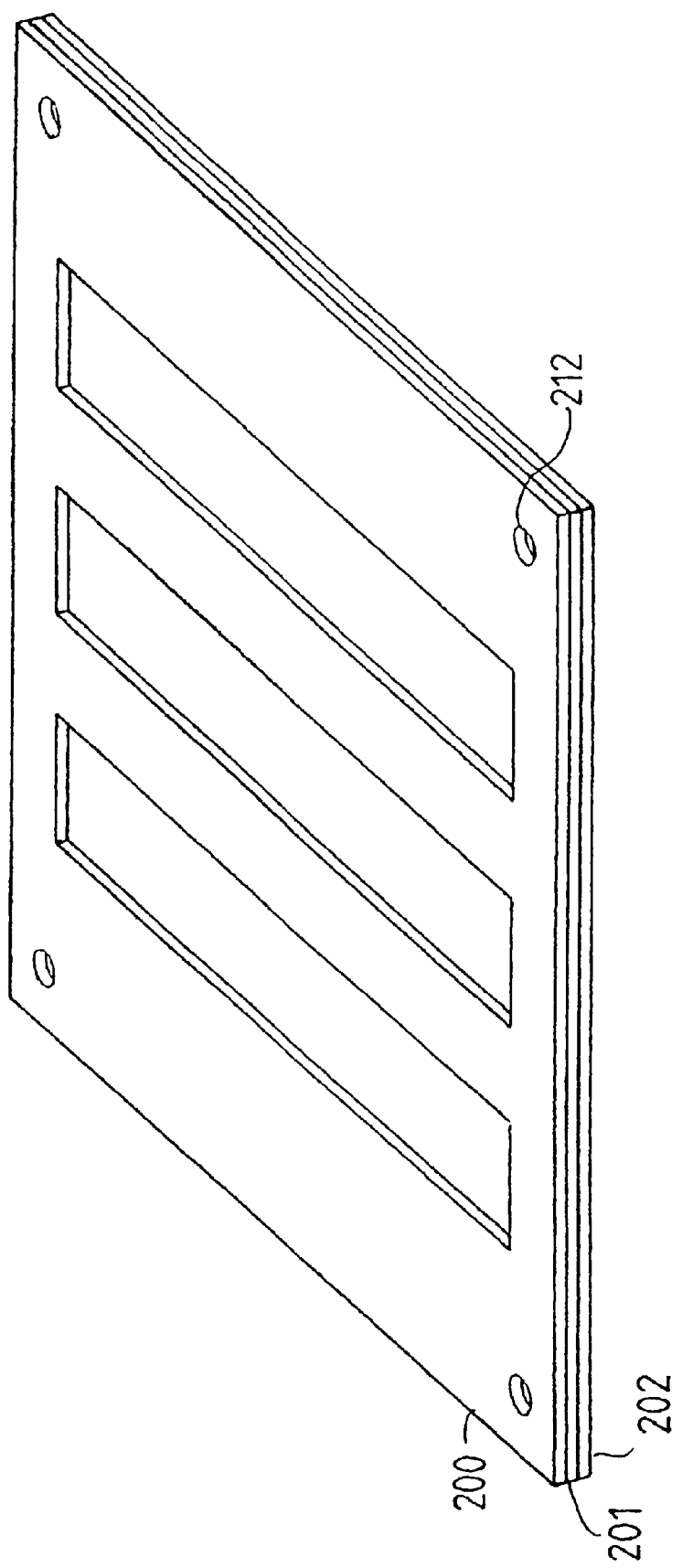
FIG. 2 of the drawings is a perspective view of the three laminate layers after lamination.

While this invention is susceptible of embodiment in many different forms, there is shown in the drawings and will herein be described in detail, several specific embodiments, with the understanding that the present disclosure is to be considered as an exemplification of the principles of the invention and is not intended to limit the invention to the embodiments illustrated.

Figure 3:
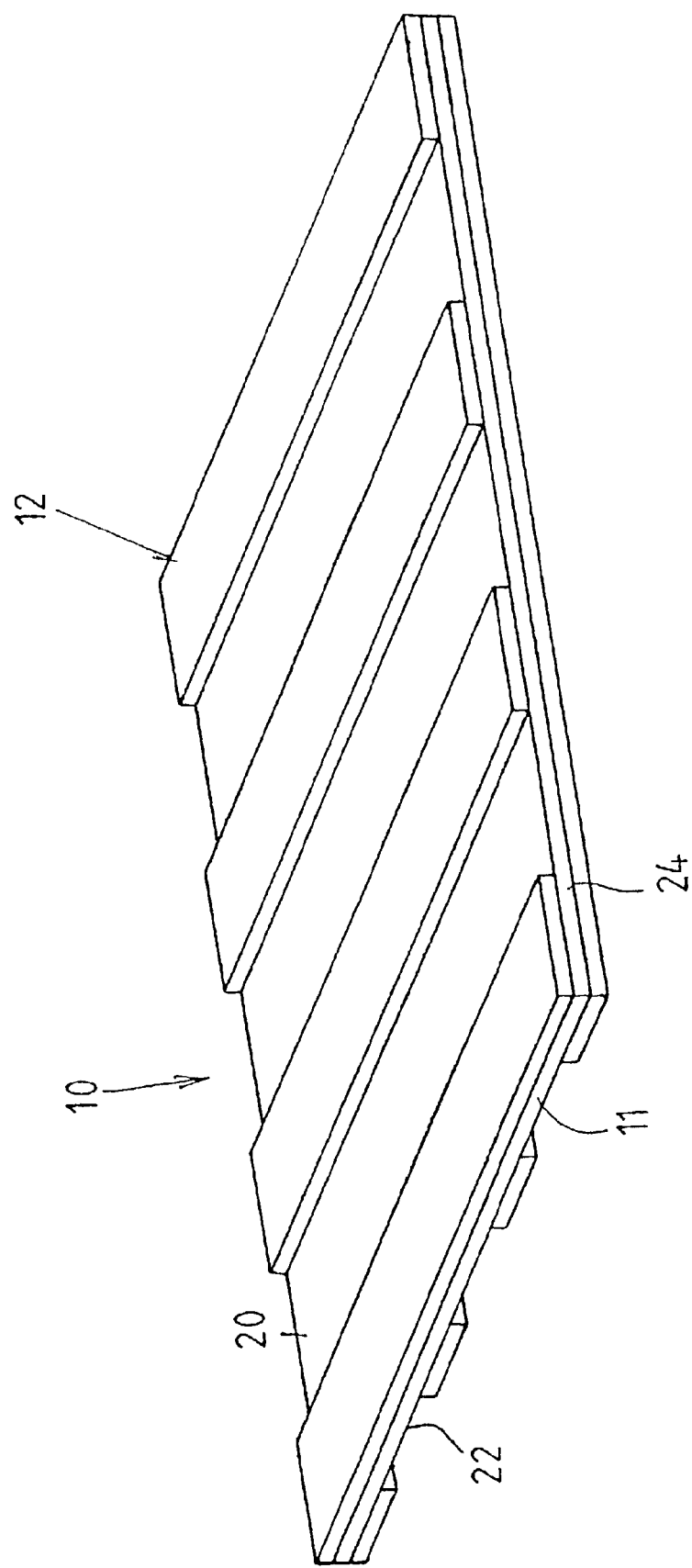
FIG. 3 of the drawings is a perspective view of the three laminate layers after trimming of the outer regions of same.
Figure 4:
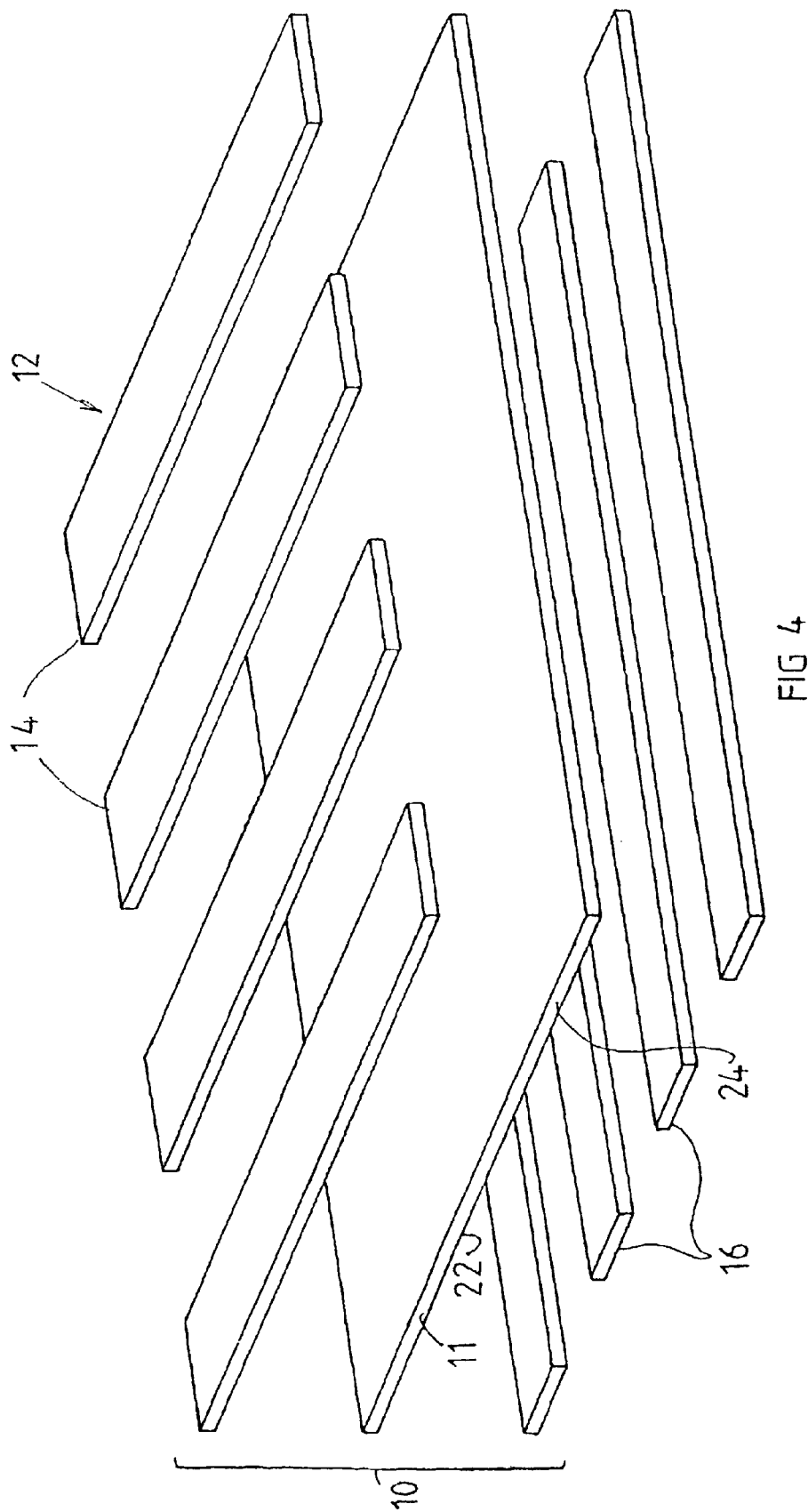
FIG. 4 of the drawings is an exploded view of the various structural support members and the central layer of the electrolyte of the present invention.

Electrolyte 10 is shown in FIGS. 3 and 4 as comprising electrolyte plate 1 1 and means 12 for providing support to the electrolyte plate. Electrolyte plate 11 includes upper surface 20, lower surface 22 and outer peripheral edge 24. The electrolyte plate comprises a yttria stabilized zirconia material, although other conventional electrolyte materials are likewise contemplated for use. While not limited hereto, electrolyte plate 11 has a thickness of less than 50 $\mu$m, and preferably about 30 $\mu$m.

Support providing means 12, as shown in FIG. 3, comprises non-intersecting upper support members, such as upper support member 14, and non-intersecting lower support members, such as lower support member 16. Each upper support member 14 is laminated to upper surface 20 of electrolyte plate 10 and extends to outer peripheral edge 24. Similarly each lower support member 16 is laminated to lower surface 22 of outer peripheral edge 24. Although the term "laminated" is used, it will be readily understood that other methods of attachment, or integration can be used, including, but not limited to, forming the respective support members as part of a unitary, integral structure with the associated electrolyte plate.

Each of the lower and upper support members comprise a material substantially identical to, or substantially compatible with the electrolyte plate. In the embodiment shown, the material comprises a yttria stabilized zirconia, although other conventional materials are likewise contemplated for use. While certainly not limited thereto, where all three structures overlap, the total thickness of the laminate in such a region may be on the order of 180 $\mu$m.

In the embodiment shown in FIGS. 3 and 4, the upper and the lower support members are uniform in size and shape. In addition, the upper support members 14 are all positioned parallel to each other and in a direction which is perpendicular to the positioning of lower support members 16, which are likewise all positioned parallel to each other. The upper and lower support members are positioned relatively closely together so that only relatively small regions which do not have any support exist between them.

Figure 5:
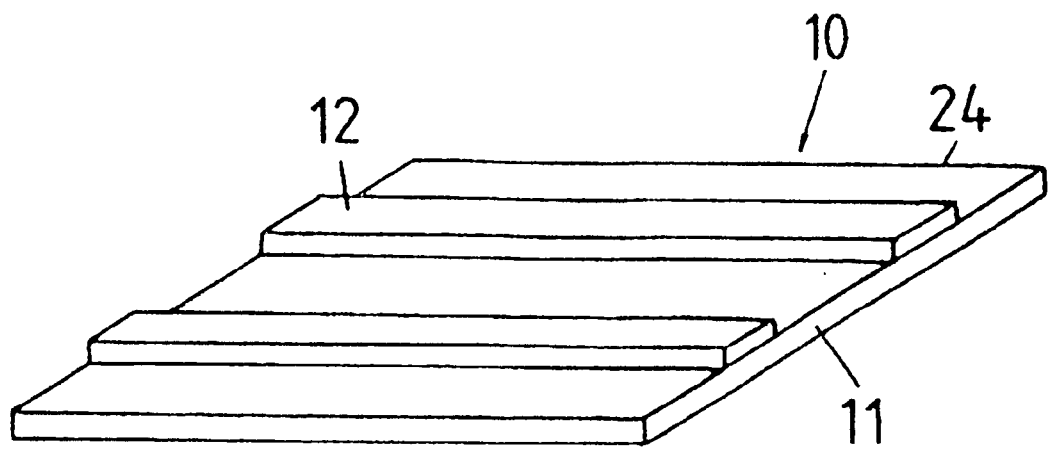
FIG. 5 of the drawings is a perspective view of an alternate embodiment of the electrolyte of the present invention.
Figure 6:
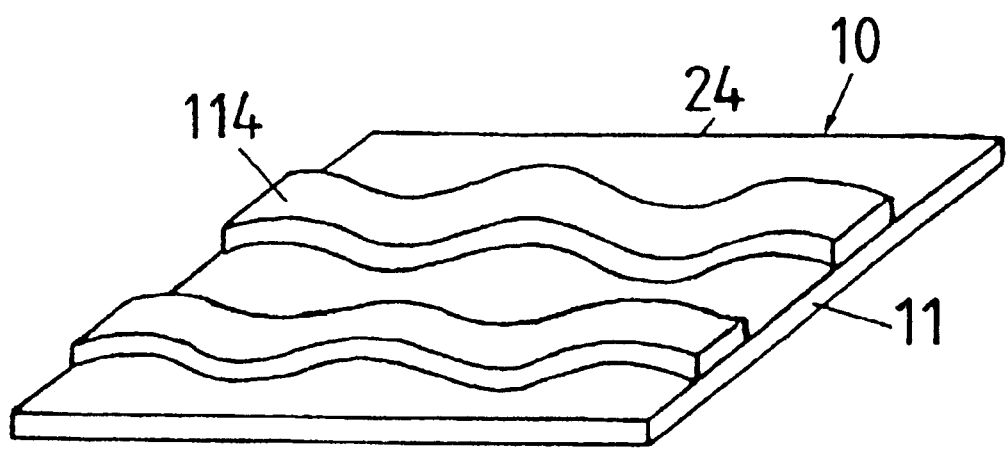
FIG. 6 of the drawings is a perspective view of another alternate embodiment of the electrolyte of the present invention.

However, the structure is not limited to support members of any particular size, shape and/or spacing. In particular, as shown in the embodiment of FIG. 5, the non-intersecting support members may be applied to only one of the upper and lower surface of the electrolyte plate. In addition, where both lower and upper support members are utilized, it is not necessary that the upper and lower support members coincide, or have any particular uniform spacial relationship. Moreover, the shape and size of the individual non-intersecting support members may be varied, as shown in the alternative embodiment of FIG. 6, wherein the upper support members 114 comprise non-intersecting sinusoidal waves which are arranged parallel to each other. The use of non-intersecting support members, as will be explained below with respect to the method, enhances the ability to economically produce the SOFC electrolyte—while providing mechanical strength and advantageous performance to the SOFC.

To fabricate the electrolyte, as shown in FIG. 1, three plates, 200, 201 and 202 are formed. Plate 201 corresponds to electrolyte plate 11 and plates 200 and 202 correspond to the upper and lower support members 14 and 16, respectively. All of plates 200, 201 and 202 may be formed through a variety of means, including a laminated tape process, or a roll embossed tape among others. Once initially formed, registration openings, such as registration opening 212, may be formed in each of the four plates to facilitate proper orientation of the plates relative to each other prior to lamination. Concurrently with the formation of the registration openings, openings 230, 231 and 232 are formed in plate 200. Similar openings 233, 234 and 235 are cut or punched through plate 202. Of course, these openings may be formed prior to or after the formation of the registration openings.

Once each plate has been properly sized and configured to include the desired openings, as shown in FIG. 1, these plates are overlayingly layered so that plates 200 and 202 sandwich plate 201 therebetween. Subsequently, the plates are aligned and properly oriented using the registration openings 212. Once positioned in the desired orientation, the three plates are laminated to each other, through various lamination techniques, to form a single integral green electrolyte material. After lamination, the outer edges are trimmed to eliminate the registration holes and to size the electrolyte to the desired dimension, to, in turn, define outer perimeter 24.

In use in an SOFC, because of the support members, the electrodes do not need to function as the primary support member, and, thus, the electrolyte supports are unaffected by oxygen potentials incompatible with the electrode materials Further, due to the support members, the electrodes (not shown) that are utilized with this electrolyte can be applied to an already sintered electrolyte, or cofired together with the green electrolyte. Advantageously, additional support for the electrolyte is provided by the electrodes, cofired, or applied to the sintered electrolyte.

In operation, such an electrolyte has certain advantages. In particular, the entirety of the plate is active, and the performance of each region corresponds to the local thickness of the electrolyte. For example, for an electrolyte that is 180 $\mu$m at its thickest (proximate the support member regions) and 30 $\mu$m at its thinnest, the thin regions have 6 times the performance of a uniform 180 $\mu$m thick electrolyte and the thick 180 $\mu$m regions have the same performance of a uniform 180 $\mu$m thick electrolyte. Thus, for an electrolyte of the present invention on an area averaged performance evaluation, the performance of the electrolyte made according to the invention in the above thicknesses, would be 3.5 times that of a uniform 180 $\mu$m electrolyte. To obtain such performance, one would have to utilize a uniformly thick electrolyte having a thickness of 50 µm which is difficult, if not impossible to effectively utilize in a larger or a stacked cell. Thus, certain advantages in performance can be realized, with the foregoing robustly structured electrolyte. Moreover, such advantages can be realized without sacrificing production difficulties.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. An electrolyte for a solid oxide fuel cell comprising:
    an electrolyte plate having an upper and a lower surface; and
    means for supporting the electrolyte plate, wherein the supporting means includes a plurality of independent non-intersecting support members constructed from substantially the same material as the electrolyte plate positioned on at least one of the upper and lower surface of the electrolyte plate.

2. The electrolyte according to claim 1 wherein the supporting means includes a plurality of non-intersecting support members positioned on both of the upper and lower surfaces of the electrolyte plate.

3. The electrolyte according to claim 2 wherein the non-intersecting support members on the upper surface of the electrolyte plate are substantially perpendicular to the non-intersecting support members on the lower surface of the electrolyte plate.

4. The electrolyte according to claim 2 wherein the non-intersecting support members are substantially identical in geometric configuration.

5. The electrolyte according to claim 1 wherein the non-intersecting support members are substantially identical in geometric configuration.

6. The electrolyte according to claim 4 wherein the non-intersecting support members are substantially rectangular.

7. The electrolyte according to claim 4 wherein the non-intersecting support members are substantially sinusoidal.

8. The electrolyte according to claim 1 wherein the non-intersecting support members are of a thickness greater than the thickness of the electrolyte plate.

9. The electrolyte according to claim 1 wherein the non-intersecting support members extend across the entirety of the electrolyte plate.

10. The electrolyte according to claim 1 wherein the electrolyte plate and the non-intersecting support members comprise a stabilized zirconia.

11. A method of manufacturing an electrolyte for a solid oxide fuel cell comprising the steps of:
    providing an electrolyte plate having an upper surface and a lower surface;
    providing a second plate constructed from substantially the same material as the electrolyte plate;
    forming at least one opening through the second plate;
    positioning the second plate on one of the upper and the lower surface of the electrolyte plate in a desired orientation;
    associating the electrolyte plate with the second plate; and
    trimming the associated electrolyte plate and second plate so as to render a plurality of independent non-intersecting support members on the electrolyte plate.

12. The method according to claim 11 further including the steps of:
    providing a third plate;
    forming at least one opening through the third plate;
    positioning the third plate on the other of the upper and the lower surface of the electrolyte plate in a desired orientation; and
    associating the third plate with the electrolyte plate,
    wherein the step of trimming further renders a plurality of non-intersecting support members on both surfaces of the electrolyte plate.

13. The method according to claim 12 wherein the step of positioning the third plate comprises positioning the third plate such that the at least one opening of the second plate is perpendicular to the at least one opening of the third plate.

14. The method according to claim 12 wherein:
    the step of forming at least one opening through the second plate comprises the step of forming at least two substantially identical openings parallel to each other;
    the step of forming at least one opening through the third plate comprises the step of forming at least two substantially identical openings parallel to each other, the openings of the third plate substantially corresponding to the openings of the second plate; and
    the step of positioning the third plate comprises the positioning of the third plate such that the openings of the second plate are substantially perpendicular to the openings of the third plate.

15. The method according to claim 14 wherein the openings of each of the second and third plates are substantially rectangular in shape.

16. The method according to claim 11 wherein the step of forming at least one opening through the second plate, comprises the step of forming at least two substantially identical openings parallel to each other.

17. The method according to claim 11 further comprising the step of:
    forming registering openings on each of the electrolyte plate and the second plate; and
    the step of positioning further comprises the step of aligning the registering openings of each of the electrolyte plate and the second plate, to in turn, properly orientate the plates relative to each other.

* * * * *